United States Patent [19]

Sangiamo et al.

[11] Patent Number: 4,489,368

[45] Date of Patent: Dec. 18, 1984

[54] HIGH INTENSITY DISCHARGE LIGHT FIXTURE

[76] Inventors: Richard Sangiamo, 263 E. 4th Ave., Roselle, N.J. 07203; Thomas Russello, 752 Newark Ave., Elizabeth, N.J. 07208

[21] Appl. No.: 565,908

[22] Filed: Dec. 27, 1983

[51] Int. Cl.[3] .................................... B60Q 1/00

[52] U.S. Cl. .................................... 362/368; 362/362; 362/373; 362/375; 362/388; 362/427; 362/267; 362/269; 362/285; 362/294

[58] Field of Search ............... 362/362, 368, 373, 375, 362/388, 427, 267, 269, 285, 294

[56] References Cited

U.S. PATENT DOCUMENTS

| | | | |
|---|---|---|---|
| 3,840,734 | 10/1974 | Oram | 362/267 |
| 4,425,609 | 1/1984 | Grindle | 362/267 X |

*Primary Examiner*—Stephen J. Lechert, Jr.

[57] ABSTRACT

A high intensity discharge light fixture is provided wherein the conventional gaskets are replaced by joints which prevent water from entering the fixture but permit free air flow. The joints are formed by components, at least one of which terminates in a U-shaped section and the other of which interdigitates with the U-shaped section. The leg of the U-shaped section directed toward the fixture interior is longer than the leg directed away from the fixture thereby providing a water barrier.

14 Claims, 4 Drawing Figures

HIGH INTENSITY DISCHARGE LIGHT FIXTURE

BACKGROUND OF THE INVENTION

The present invention relates to high intensity discharge (H.I.D.) lighting fixtures and in particular to an improved configuration for the components of such fixtures.

High intensity discharge light fixtures of the type utilizing high pressure sodium, metal halide or mercury lamps generate considerable heat when in use. Such fixtures are commonly used in exterior environment such as parking lots, sports arenas, for public lighting and the like. As a result, the fixtures must be built to withstand severe weather conditions and particularly to protect the lamp from rain and snow. One obvious way to protect the lamp is to seal the fixture components so as to make them water tight. However, by making the fixtures water tight heat generated by the lamp is trapped within the fixture. That is, the gaskets used to make the fixture water tight also serve as barriers to the flow of cooling air for the lamp. As a result, the fixture tends to run hot and must be designed with a sufficiently enlarged lamp area to permit the lamp heat to be disipated through conduction. This results in an increased use of material plus an enlarged fixture. In addition, the intense heat generated within the lamp housing tends to produce a vacuum condition which draws humid air and dirt particles into the fixture through any leak in the seal that may eventually occur. Thus, the sealed fixture of the prior art tends to defeat its own principal purpose in time.

In view of the above, it is the principal object of the present invention to provide an improved high intensity discharge light fixture which permits a free flow of air into the fixture interior while still protecting the fixture from water.

A further object is to provide such a fixture which eliminates the need for gaskets at the interface between fixture components.

A still further object is to provide such a fixture which may operate with a conventional high intensity discharge lamp.

Still another object is to provide such a fixture wherein the size of the lamp compartment and other components may be minimized.

Still other objects and advantages will be apparent from the following description of the present fixture.

SUMMARY OF THE INVENTION

The above and other beneficial objects and advantages are attained in accordance with the present invention by providing a high intensity discharge light fixture housing having first and second housing components. In the conventional fixture, a gasket would be provided in the joint between the fixture components. In accordance with the present invention one of said housing components terminates in a U-shaped section defining the joint between the components. The other of the housing components terminates at an end interdigitated between the legs of the U. The interior leg of the U extends from the base beyond the exterior leg of the U so that any water tending to collect in the base of the U would overflow the exterior leg before overflowing the interior leg. Drainage channels in the exterior surface of the one housing component direct water away from the housing interior.

DETAILED DESCRIPTION OF THE PREFERRED EMBODIMENT

Figure 1:
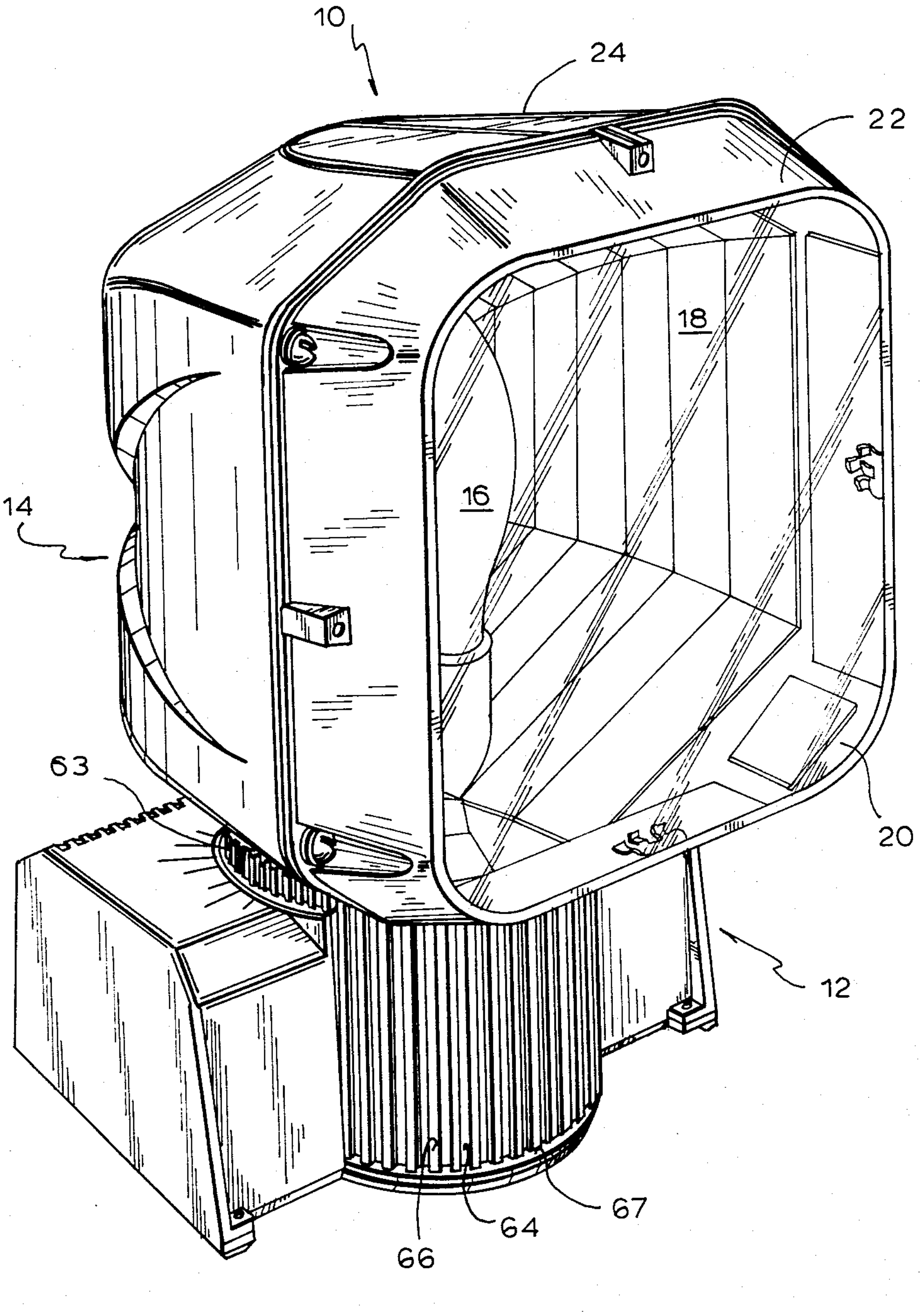
FIG. 1 is an isome·ıc view of a high intensity discharge light fixture in accordance with the present invention.
Figure 2:
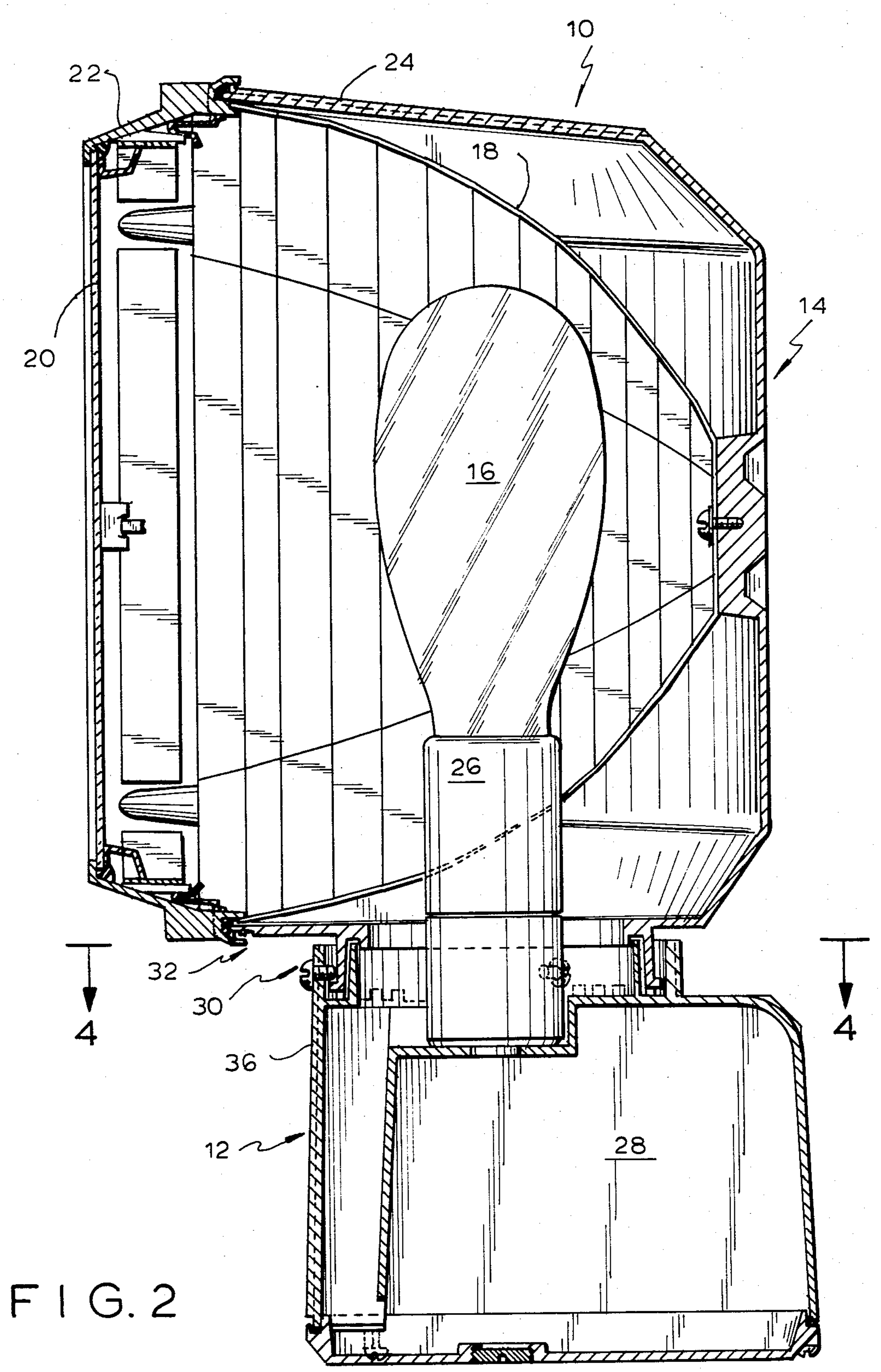
FIG. 2 is an elevational sectional view of the present fixture.

Reference is now made to the drawings and to FIG. 1 in particular wherein a high intensity discharge light fixture 10 in accordance with the present invention is depicted. The fixture 10 generally comprises a ballast compartment 12 and lamp compartment 14. The ballast compartment contains the various electrical components (not shown) for the fixture. The lamp compartment 14 contains the lamp 16 as well as the lamp reflector 18 which surrounds the lamp. The open front end of lamp compartment 14 is closed by a lens 20 contained in a frame 22 secured to the rear 24 of the lamp housing. The lamp 16 may be of the high pressure sodium, metal halide or mercury type. Both the lens housing and ballast compartments are made of conventional materials such as cast aluminum.

To complete the general description of fixture 10 it should be noted that the socket 26 for lamp 16 is connected to the ballast compartment 12 and extends into the lamp compartment 14 through an opening in the reflector 18. The ballast and other electrical components are contained in a portion 28 of the ballast compartment 12 below the socket 26.

The present invention resides in the unique joint arrangement which permits the fixture 10 to be assembled without the use of gaskets and which prevents water from entering the fixture regardless of the orientation of the fixture when mounted. The unique joint is provided at the juncture of the ballast compartment and lamp compartment (joint 30) and also between the lens frame 22 and the rear portion 24 of the lamp housing (joint 32).

Figure 3:
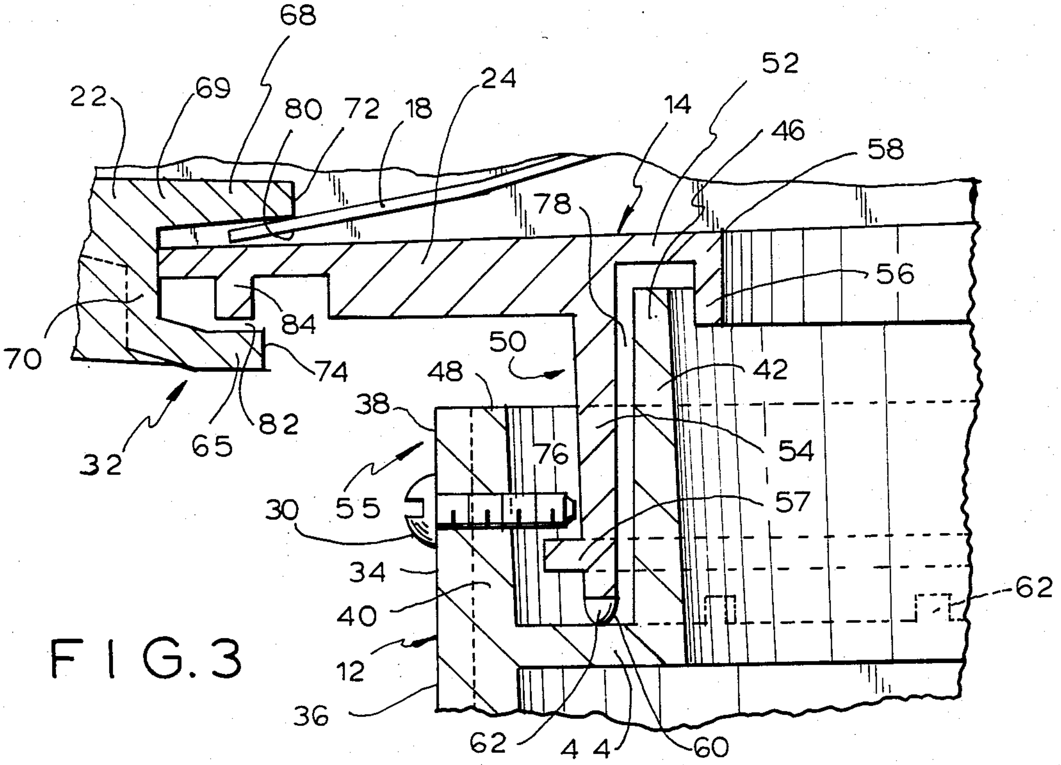
FIG. 3 is an enlarged fragmentary sectional view of joints between the fixture ballast housing and lamp housing; and, FIG. 4 is a sectional view taken along reference lines 4—4 of FIG. 2.

The joint 30 between the ballast compartment 12 and lamp compartment 14 as well as the joint 32 between the front and rear sections of the lens compartment are shown in detail FIG. 3. In this regard, joint 30 is formed of the upper end 34 of the wall 36 defining the ballast compartment along with complementary portions of the rear portion 24 of the lens compartment. In section, the upper end 34 of the wall 36 defining the ballast compartment terminates in a generally U-shaped section 38. The section includes a first leg 40 directed toward the exterior of the fixture, a second leg 42 directed toward the fixture interior and a base 44. The upper end 46 of leg 42 (i.e., the interior leg) extends beyond the top 48 of the exterior leg. The complementary portions 50 of the lamp compartment 14 comprise an inverted U-shaped section 52 formed of an exterior leg 54, an interior leg 56, and a base 58. The exterior leg 54 of the inverted U-shaped section 52 is interdigitated between the legs 40 and 42 of the U-shaped section. The bottom end 60 of leg 54 rests on the base 44 of the U-shaped section 38. A series of slots 62 extend about the bottom of the leg 54 as shown. Since leg 54 seats freely on base 44 the lens compartment 14 is free to rotate with regard to the ballast compartment. Thus, it may be desirable to provide set screws 55 to lock the lens compartment into a desired position. Thus, when set screw 55 is loosened the lamp housing may be rotated about the ballast housing but the interference between the end of the set screw and a ledge 57 prevents the lamp housing from being removed from the ballast housing.

Figure 4:
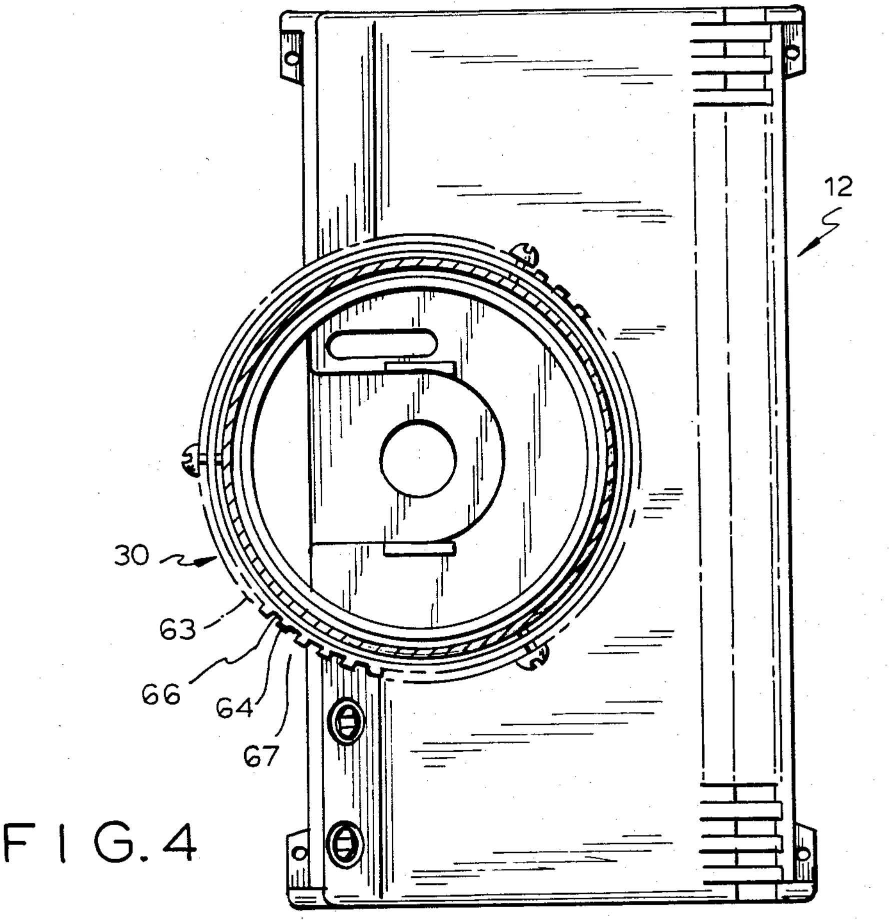

Referring to FIGS. 1 and 4 it can be seen that the upper wall 36 extends from a circular neck 63 defined in the exterior of the ballast compartment 12. The neck, and an extension along the front of the fixture, are defined by a series of fins 64 seperated by channels 66 which cooperate in defining conduits 67 leading away from the joint 30. These conduits serve to carry any water away from the joint in a manner to be discussed. The fins and channels also aid in dissipating heat generated within the fixture.

Referring now to joint 32 it can be seen that the lens frame portion 22 of the lamp compartment terminates at its rear end in a U-shaped section 69 turned on its side toward the rear. The U-shaped section 69 comprises a first leg 65 directed toward the fixture exterior, (i.e. away from the interior of the lamp housing), a leg 68 directed toward the fixture interior and base 70. As noted, the free end 72 of leg 68 extends beyond the free end 74 of leg 65.

When the fixture is mounted in a vertical position (as shown in FIG. 1) the inner leg 42 of joint 30 prevents any water that my fill the joint 30 from flowing into the ballast housing. The water will first flow over the outer leg 40 and thus carried away from the joint by the conduits 67. At the same time, air may freely flow into the ballast housing through the passage 76, slots 62, and passage 78. In this regard, it should be noted that the water level within passage 78 will drain over the top 48 of exterior wall 40 before flowing into the ballast housing. When the fixture is in the vertical position gravity draws any falling water or snow away from the interior of the lamp housing.

The present fixture need not be mounted only in a vertical position. When the fixture is mounted in a horizontal position, gravity prevents falling water from entering the ballast housing. The lamp housing is protected by joint 32 and particularly wall 68 which prevents any water which collects in passage 80 from spilling into the lamp housing. Any such water would first overflow wall 65 and fall outside the fixture. Air may enter the lamp housing through passages 80 and 82.

In any position between the vertical and horizontal mounting positiond described above, flange 57 and a similar flange 84 cooperate with the walls of joints 30 and 32 in preventing water from entering the interior of the fixture by directing any such water out of the fixture before it could overflow into the fixture.

Thus, in accordance with the above the aforementioned objectives are effectively attained.

Having thus described the invention, what is claimed is:

1. A high intensity discharge light fixture comprising:
 a fixture housing;
 a first housing component terminating at one end in a U-shaped section defined by a first leg directed toward the fixture interior, a second leg directed toward the fixture exterior; and a base interconnecting said legs, said first leg being at least as long as said second leg;
 a second housing component;
 a first end of said second housing component interdigitated between said first housing component first and second legs whereby to define a joint between said housing components; and
 means for directing water from said joint.

2. The fixture in accordance with claim 1 wherein said first leg is longer than second leg.

3. The fixture in accordance with claim 2 wherein at least one of said housing components has an interior surface directed toward the housing interior and an external surface directed toward the housing exterior; a plurality of conduits extending along said external surface; and each of said conduits being in communication with said joint whereby to provide a drainage path from joint.

4. The fixture in accordance with claim 3 wherein said first housing component is provided with said conduits and said conduits communicate with the first leg of said U-shaped section.

5. The fixture in accordance with claim 2 wherein said second housing component terminates in an inverted U-shaped section having a first leg, a second leg and a base;
 one of said inverted U-shaped section legs being interdigitated between the legs of said U-shaped section; and one of said U-shaped section legs being interdigitated between the inverted U-shaped section legs.

6. The fixture in accordance with claim 5 wherein at least one of said housing components has an interior surface directed toward the housing interior and an external surface directed toward the housing exterior; a plurality of conduits extending along said external surface; and each of said conduits being in communication with said joint whereby to provide a drainage path from joint.

7. The fixture in accordance with claim 6 wherein said conduits communicate with the first leg of said U-shaped section.

8. The fixture in accordance with claim 5 wherein said inverted U-shaped section one leg engages the base of said U-shaped section and further comprising slots extending through said one leg.

9. The fixture in accordance with claim 1 wherein said first housing component comprises a ballast compartment for said fixture and said second housing component comprises the lamp compartment for said fixture.

10. The fixture in accordance with claim 9 wherein said lamp compartment is rotatably mounted to said ballast compartment.

11. The fixture in accordance with claim 1 wherein said first housing component comprises an open faced lamp compartment and said second housing component comprises a lens frame for said lamp compartment.

12. A high intensity discharge light fixture comprising:
 a ballast housing and a lamp housing;
 a joint defined between said ballast and lamp housings, said joint including a U-shaped section on one of said housings engaging the other of said housings, said U-shaped section having a longer leg directed toward the interior of the fixture and a shorter leg directed toward the exterior of the fixture;
 and means extending from said joint for drawing water away from said joint.

13. The light fixture in accordance with claim 12 wherein said lamp housing comprises an open faced compartment and a lens frame assembly for closing said compartment;

a joint defined between said open faced compartment and said lens frame, said joint including a U-shaped section on one of said frame or compartment, said U-shaped section having a longer leg directed toward the interior of said compartment and a shorter leg directed away from the interior of said compartment.

14. The light fixture in accordance with claim 13 wherein said ballast-lamp housing joint is substantially normal to the joint between said lens frame-open faced compartment.

* * * * *